United States Patent [19]

McMaster et al.

[11] Patent Number: 4,838,703
[45] Date of Patent: Jun. 13, 1989

[54] INJECTION IMPELLER FOR AGRICULTURAL CHEMICALS

[75] Inventors: Galen M. McMaster, American Falls; Donald W. Sunderman, Aberdeen, both of Id.

[73] Assignee: G & D Whirlwind Inc., American Falls, Id.

[21] Appl. No.: 223,404

[22] Filed: Jul. 25, 1988

[51] Int. Cl.⁴ .............................................. B01F 5/02
[52] U.S. Cl. .................... 366/169; 137/898; 366/280
[58] Field of Search ............ 137/896, 897, 898, 890; 366/155, 169, 280

[56] References Cited

U.S. PATENT DOCUMENTS

| | | | |
|---|---|---|---|
| 1,106,736 | 8/1914 | Schuler | 366/169 X |
| 3,570,508 | 3/1971 | Boggs | 366/280 X |
| 4,015,829 | 4/1977 | Forster | 366/169 X |

FOREIGN PATENT DOCUMENTS 593724  2/1978  U.S.S.R. .............................. 366/169

Primary Examiner—Robert G. Nilson
Attorney, Agent, or Firm—K. S. Cornaby

[57] ABSTRACT

An apparatus for the injection of liquid additives, such as fertilizers and insecticides, into irrigation sprinkler systems for even dispersal within the least distance of conduit pipe from the point of injection is presented. Said injection is accomplished by injection of the additive through a hollow L-shaped spindle about the horizontal arm of which is a rotatable hollow hub from which extend hollow injection tubes, along the length of each there being a semi-circular impeller blade. The apparatus, centrally located within the conduit pipe of an irrigation system, disperses pressure-injected additive while the rush of water through the conduit causes the impeller to rotate, thus further facilitating dispersion of the additive.

4 Claims, 4 Drawing Sheets

INJECTION IMPELLER FOR AGRICULTURAL CHEMICALS

BACKGROUND OF THE INVENTION

This invention is addressed to use of irrigation and watering systems in the farming industry, as well as sprinkling systems in smaller applications such as residential watering systems and to other applications which may require mixing in a short reach of conduit of an injectate in an effluent flow. Particularly, in the irrigation of large fields in farming, water obtained from a well or surface water source is distributed to the fields through medium pressure pipes with branch lines which feed lateral sprinkler lines equipped with sprinkler heads. It is often desirable to make applications of fertilizers or pesticides concurrently with the irrigation process, and such application is typically effectuated by injection of the additive in liquid form into irrigation water at some point along the length of the conduit pipe leading to the branch lines of the system. Injection has been accomplished by any number of means ranging from mere injection of the liquid additive through an aperture in the conduit pipe, allowing the additive to blend with the irrigation water as it may, to injection systems which are an integral part of the conduit pipe and which disperse the additive into the main flow at a calculated rate. These integral systems, as disclosed in the prior art, accomplish integration of the additive into the system, but do so without attention to relative uniform concentrations of additive being dispersed. In other words, the currently used systems do not achieve mixture of equal concentrations of water and additive within the main conduit, and do not achieve equal concentrations prior to any branching of the main conduit into the lateral irrigation lines. The mixing of two non-miscible fluids is dependent upon the turbulence of water in the conduit pipe and the pipe length prior to bifurcation or branching to lateral lines. A pipe length roughly 20 times the diameter of the pipe is needed to produce adequate mixing of the liquids. Frequently, geometrical constraints and varying irrigation systems do not provide the length of pipe necessary to accommodate thorough mixing of the liquids. The failure of proper mixing and distribution results in over-application of additive in some areas of the field while other areas suffer from an application of too little additive. The present invention has been designed to accomplish injection and thorough mixing of liquid additives into irrigation systems in the shortest possible distance. Calculation of optimum dispersal distances and utilization of monitored flow rates of additive into the flow of water assures maximum mixture and optimal application of the additive. The advantageous use of the present invention over prior art inventions is more fully appreciable below.

SUMMARY OF THE INVENTION

A rotor with a plurality of outwardly extended injection tubes is centrally located within the main conduit pipe, oriented transversely to the flow of water. The invention is located at an annular position at the center of discharge, this location and length of discharge tubes being determined as follows:

$U$ = water velocity at a point in a pipe
$r$ = radius to a point at velocity, $U$
$R$ = radius of a conduit
$A$ = area of a conduit
$Q$ = discharge of water through a conduit
$q$ = center half of discharge
$U$ is proportional to $(R^2-r^2)$
(Parabolic velocity distribution)
Where pipe diameter is unity
$U = (1-R^2) \times$ coefficient of proportionality $$dA = 2\pi r\, dr$$
$$dQ = (1-r^2)2\pi r\, dr = 2\pi r\, dr - 2\pi r^3 dr$$
$$Q = \int_0^R 2\pi r\, dr - \int_0^R 2\pi r^3 dr$$
$$Q = \pi R^2 - \left(\frac{\pi R^4}{2}\right)$$

To find the annular center of discharge let:

$$Q = 2q$$
therefore
$$\pi R^2 - \left(\frac{\pi R^4}{2}\right) = 2\pi r^2 - \pi r^4$$

$$r = 0.541\, R$$

Therefore, the radius of rotation of the tips of the injection tubes relative to the conduit pipe is theoretically optimally 0.541 of the radius of the conduit pipe, and the invention can be manufactured in any size complimentary to the size of conduit pipe being used by merely varying the length of the injection tubes.

The injection tubes of the invention have impeller blades which, when struck by the flow of water down the conduit pipe, cause the rotor to turn. Since the only resistance to rotation is bearing friction, the head loss to operate the invention is minimal, and negligible in sprinkler irrigation systems. Liquid additive is injected into the delivery port of the invention at medium pressure. The liquid travels through a descending L-shaped hollow spindle upon which is located the rotating hub of the rotor. The liquid fills an inner cavity of the hub, and continues through the injection tubes and out into the flow of water. The additive may be injected into the stream of water at a rate proportional to the calculated flow of water in the conduit.

Tests comparing the efficiency of mixture and distribution of various injection systems have been completed on a 240 acre field which employs typical farming irrigation systems consisting of well water pumped through a 10 inch conduit which bifurcates 4.3 feet from the point of injection into 8 inch main lines from which 8 sprinkler lines branch to cover the 240 acre field. The injection systems tested were the existing injection system which consists of an injection port 10 inches upstream from the bifurcation; a standard injection system which consists of an injection port 4.3 feet upstream from the bifurcation point through which additive is injected directly into the stream; and the present invention, placed within the main conduit pipe 4.3 feet upstream from the bifurcation. Uran, a common nitrogen fertilizer, was injected into each system at a concentration of 5000 parts per million (ppm). Water samples were taken at the south and west branches of the sprinkler main, and were analyzed for concentration of ammonium and nitrate ions. The results were as follows:

TABLE 1

Effect of mixing device on fertilizer distribution in sprinkler irrigation system (ppm ammoninum and $NO_3$)

| Location | Injection Port | | | |
| --- | --- | --- | --- | --- |
|  | Standard | Rotamixer | Existing | Ave |
| South Br | 1066 | 924 | 1343 | 1111 |
| West Br | 970 | 950 | 119 | 680 |
| Ave | 1018 | 937 | 731 | 895 |

It can be seen therefore that use of the invention assures more accurate distribution of the additive through distribution into the main line and branches of an irrigation sprinkler system.

It is therefore an objective of this invention to provide a means for injecting liquid additives, such as fertilizers and insecticides, into irrigation sprinkler systems in a manner which will optimize dispersal of the additive into the system.

It is further an objective of this invention to provide a means for assuring thorough and even distribution of injected additives into irrigation sprinkler systems or other fluid systems within the least distance of the main conduit pipe between the point of injection and any bifurcation of the pipe system to feed branch lines.

It is yet another objective of this invention to provide a means for even dispersal of liquid additives throughout irrigation sprinkler systems to avoid over-or under-application of the additives to crops. These and further objectives are explained more fully below.

DETAILED DESCRIPTION OF THE PREFERRED EMBODIMENTS

Figure 1:
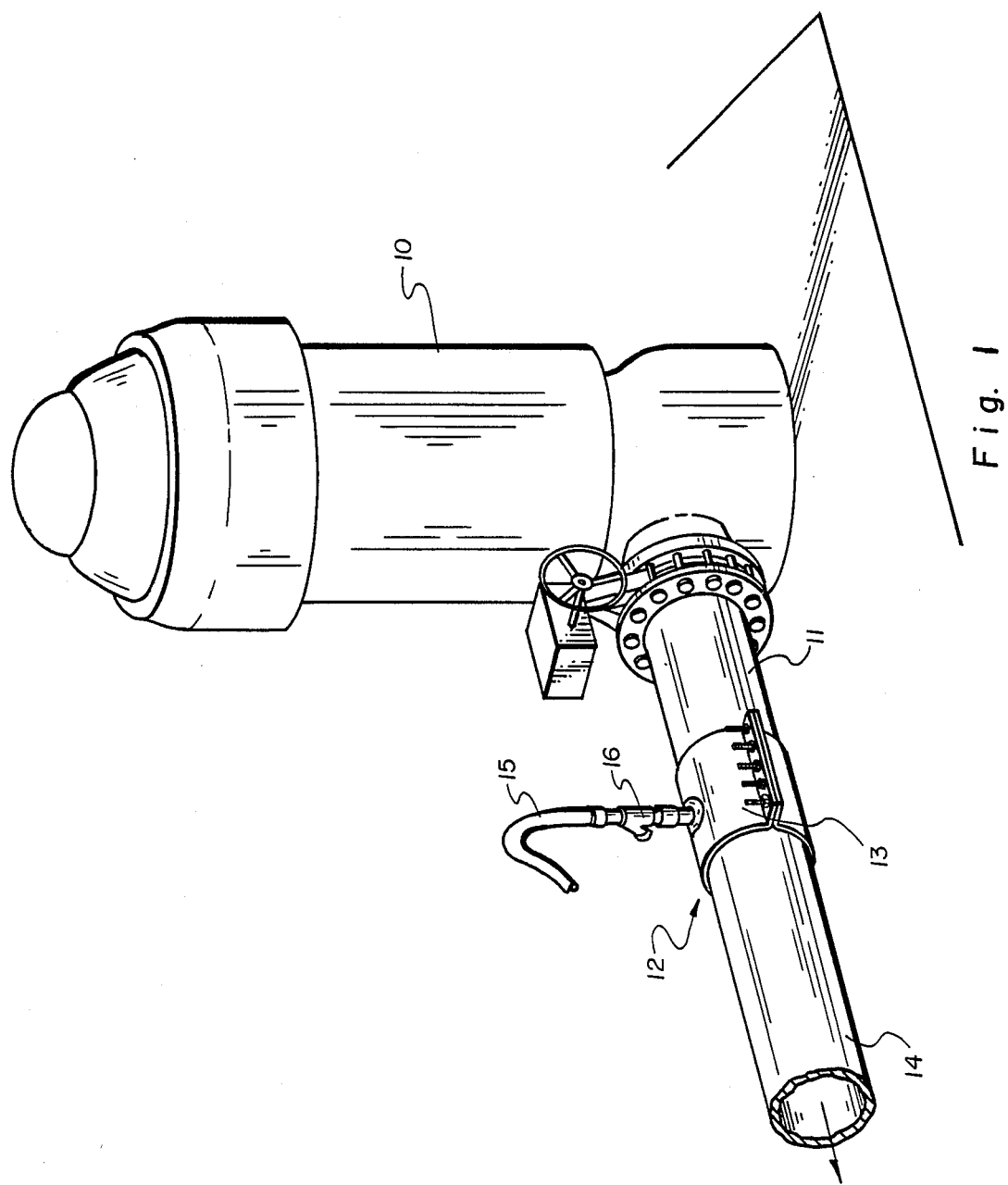
FIG. 1 is a perspective view of the invention illustrating its placement relative to the pumping system and main conduit pipe.

FIG. 1 illustrates the general means of distribution of water in an irrigation sprinkling system where a motorized deep-well turbine powered by electric motor 10 dredges well water from below into a main conduit 11. The invention, generally at 12, consists externally of a saddle clamp 13 which joins the pipe 11 emerging from the pump housing to the conduit line 14 leading to the branch lines. The fluid additive is injected into the internal mechanism through a hose 15 which transports the liquid from a nearby tank (not shown). The hose is joined to one-way check valve 16 which connects to the upward extending end of the spindle (not shown) which will be further demonstrated below.

Figure 2:
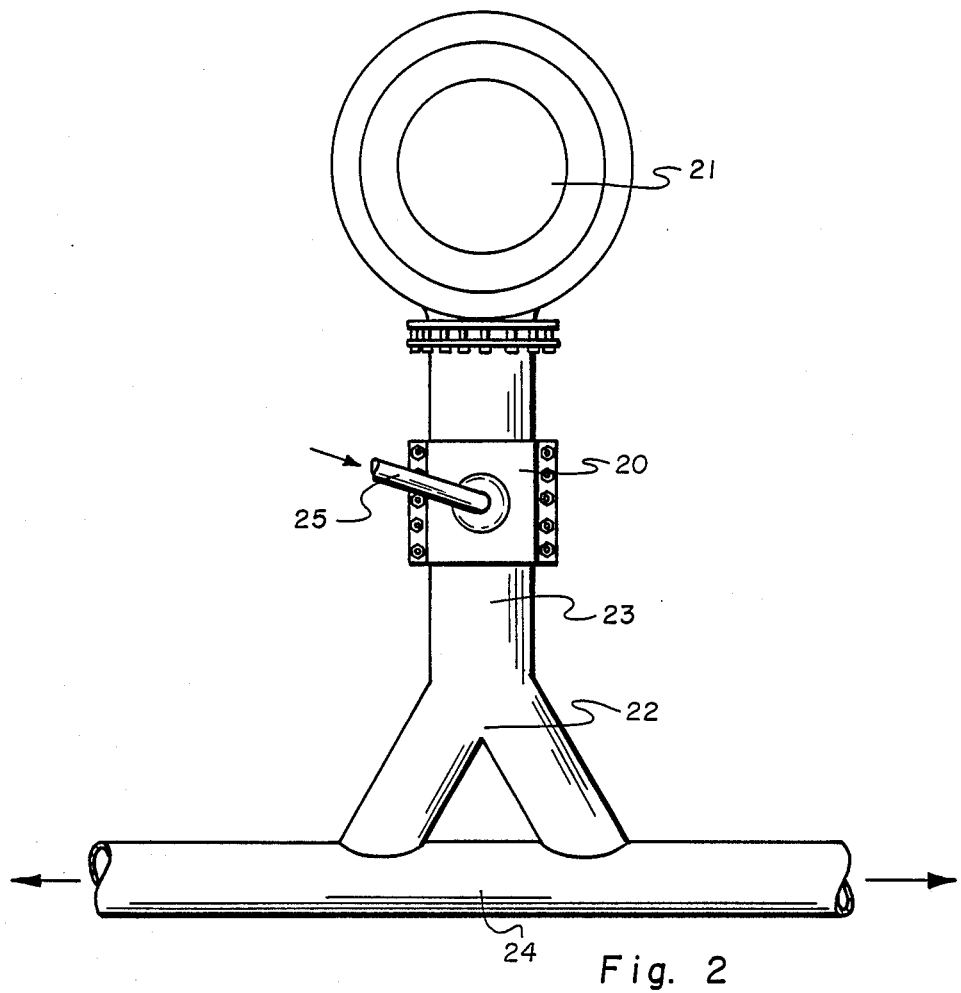
FIG. 2 is a plan view of the invention illustrating its placement relative to the pumping system and main conduit pipe, and further illustrating the bifurcation of the main conduit into the main branch line.

FIG. 2 is a plan view illustrating the location of the saddle clamp 20 down stream from the pump housing 21, and relative to the bifurcation 22 of the main conduit 23 into the branch lines 24. An arrow indicates the direction of injected additive through the injection hose 25. Further, arrows indicate the direction of flow of water and additive once it enters the branch lines 24.

Figure 3:
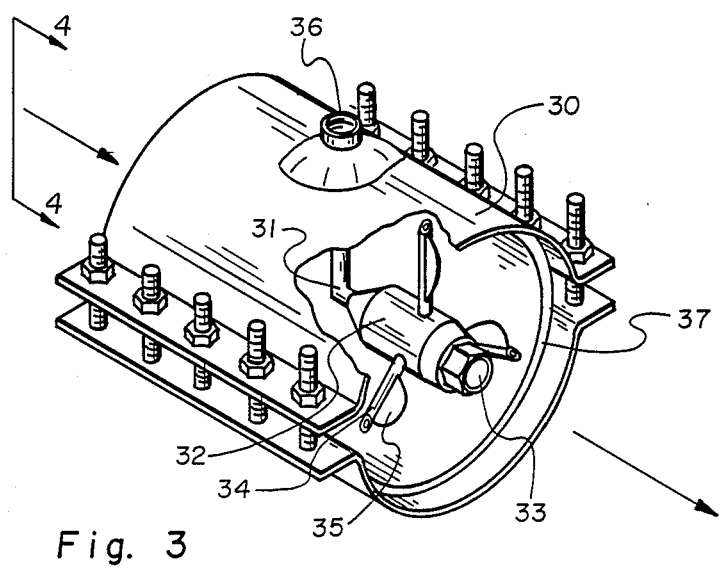
FIG. 3 is a perspective view of the invention, partially cut away to reveal the placement of the rotor relative to the flow of water which is illustrated by the arrows.

In FIG. 3, the saddle clamp 30 is shown partially cut away to reveal the internal mechanism of the invention which is comprised of an L-shaped hollow spindle 31 which has about its horizontal arm a cylindrical hollowed hub 32, tapered at either end, which rotates around the spindle. The hub is held in place on the spindle by a threaded nut 33. Projecting from the hub are a plurality of hollow injection tubes 34, and along the length of each injection tube is a substantially semi-circular blade 35 oriented obliquely to the flow of the water, the direction of that flow being demonstrated by the arrows. The coupling means 36 by which the injection hose (not shown) may be joined to the spindle is illustrated as extending through the upper half of the saddle clamp. The saddle clamp encircles a section of hollow pipe 37 which substantially conforms to the diameter of the conduit pipe to which the saddle clamp will be connected.

Figure 4:
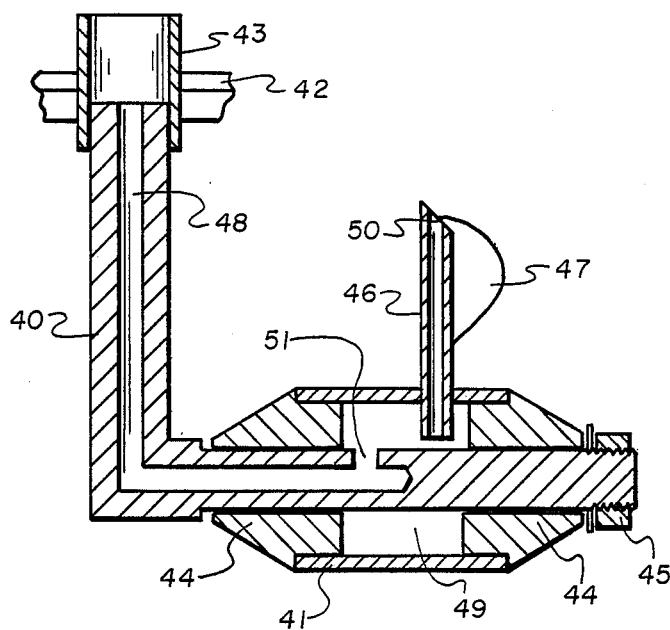
FIG. 4 is a cross-sectional view of the invention (taken at line A—A of FIG. 5)

FIG. 4 illustrates a cross-sectional view of the spindle 40 and hub 41 mechanism. The spindle extends downwardly through an aperture in the saddle clamp 42, and at the upper end, forms the coupling means 43 for attachment of the injection hose (not shown). Encircling the horizontal arm of the spindle is a cylindrical hollowed hub 41 which freely rotates thereupon. Free articulation of the two members is enhanced by placement of bearings 44 at either end of the hub, the bearings being formed of a suitable material such as polyethelene or other thermoplastic. The hub is held in place on the horizontal arm of the spindle by a threaded nut 45. Extending perpendicularly to and through the hub are a plurality of hollow injection tubes 46. To each injection tube there is connected along its length a substantially semi-circular blade 47. It may be seen that fluid additive injected into the hollow spindle from an injection hose would follow a path through the hollowed bore 48 of the spindle, exiting the inner bore through an aperture 51, into an inner cavity 49 formed around the horizontal arm of the spindle by the hollowed hub, and from that cavity the pressurized liquid would be forced through the hollowed injection tubes and out into the conduit pipe via the aperture 50 at the end of each injection tube.

Figure 5:
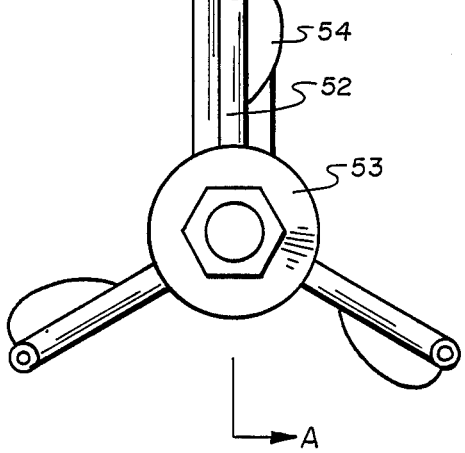
FIG. 5 is a plan view of one embodiment of the injection tubes and impeller blades.

FIG. 5 illustrates one possible embodiment of the impeller system in which there are three injection tubes 52 evenly spaced about the hub 53, each injection tube having an impeller blade 54 extending from the upper end of the injection tube to approximately two-thirds the length of the tube.

Figure 6:
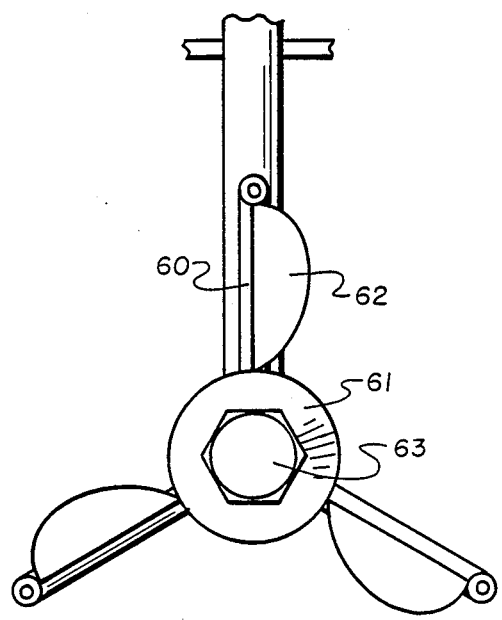
FIG. 6 is a plan view of another embodiment of the injection tubes and impeller blades.

FIG. 6 illustrates another possible embodiment of the impeller system in which there are three injection tubes 60 evenly spaced about the hub 61, each injection tube having an impeller blade 62 extending the entire length of the injection tube. Additionally, the blade attached to each injection tube is attached to the forward portion of the injection tube relative to the nut of the hub 63 and extends transversely to the hub so as to maximize the effect of rushing water contacting the face of the blade thereby causing the hub to turn.

Figure 7:
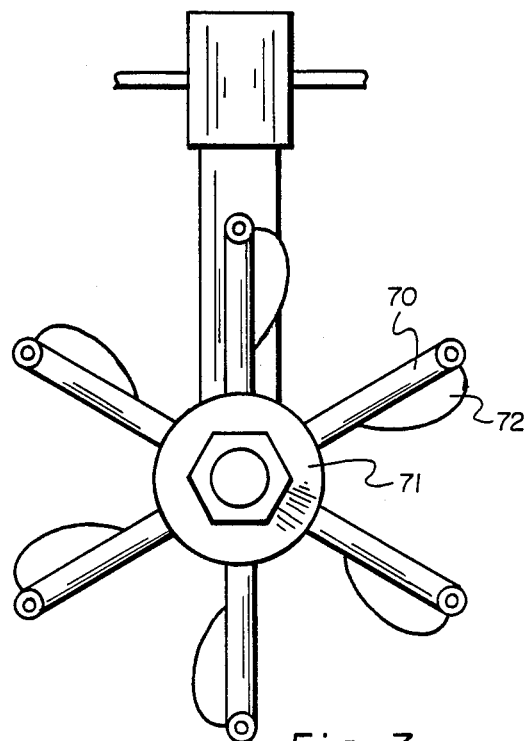
FIG. 7 is a plan view of another embodiment of the injection tubes and impeller blades.

FIG. 7 illustrates another possible embodiment of the impeller system in which there are six injection tubes 70 equally spaces about the hub 71, each injection tube having an impeller blade 72 extending from the upper end of the injection tube to approximately two-thirds the length of the tube.

Figure 8:
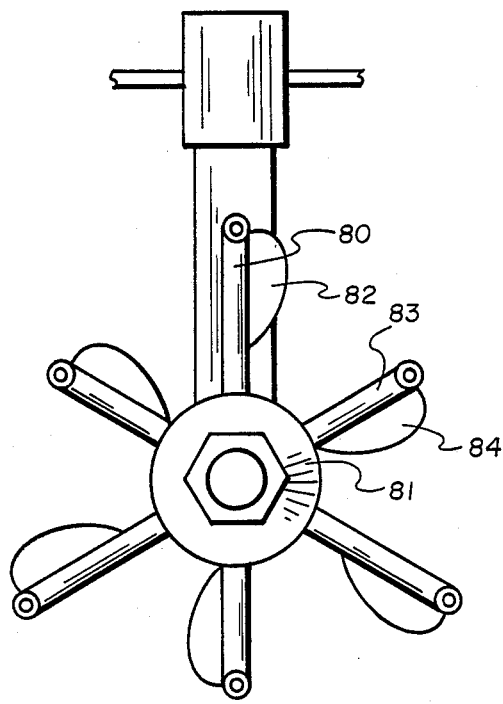
FIG. 8 is a plan view of yet another embodiment of the injection tubes and impeller blades.

FIG. 8 illustrates yet another possible embodiment of the impeller system which utilizes a variation of the other configurations in which there are six injection tubes equally spaced about the hub 81, one triad of which is formed of injection tubes 80 which are greater in length and have an impeller blade 82 extending from the upper end of the tube to approximately two-thirds its length. The opposing triad of injection tubes 83 are shorter in length and have an impeller blade 84 extending its full length.

I claim:

1. An apparatus for the injection and dispersal of liquid additives into irrigation sprinkler systems comprising in combination:
    an L-shaped hollow spindle descending downwardly through and being integrally formed with the upper half of a saddle clamp, said hollow forming an inner bore through which fluid may pass, the horizontal arm of said spindle having therein an aperture to allow fluid to move from the inner bore outward;
    a substantially cylindrical hollow hub rotatably disposed about the horizontal arm of said L-shaped hollow spindle, said hollow space forming an inner cavity for movement of fluid therethrough;
    a plurality of hollow injection tubes extending radially outward from said hub, the inner bore of each said tube being contiguous with said inner cavity of said hub, each tube being open at its outermost end;
    a substantial semi-circular impeller blade connected to each said injection tube along a degree of its length, each blade being transversely oriented to said hub.

2. An apparatus as set forth in claim I in which said cylindrical hollow hub is tapered at either end, held in place upon said spindle by a threaded nut means, and said rotation of said hub about said spindle is facilitated by placement of bearings a either end of said hub, said bearings being made of a thermoplastic or similar material.

3. An apparatus as set forth in claim 2 in which said impeller blades extend from said outermost opening of said injection tubes to approximately two-thirds the length of said length of said injection tubes.

4. An apparatus as set forth in claim 2 in which said impeller blades extend from said outermost opening of said injection tubes and extend the entire length of said tube.

* * * * *

UNITED STATES PATENT AND TRADEMARK OFFICE
CERTIFICATE OF CORRECTION

PATENT NO. : 4,838,703
DATED : June 13, 1989
INVENTOR(S) : Galen M. McMaster and Donald W. Sunderman It is certified that error appears in the above-identified patent and that said Letters Patent is hereby corrected as shown below:

In the specification, Column 2, lines 7 and 14, the formulas should appear as follows:

Line 7, $U = (1 - r^2) X$

Line 14, $Q = \int_0^R 2\pi r \, dr - \int_0^R 2\pi r^3 \, dr$

Signed and Sealed this

Seventeenth Day of April, 1990

Attest:

HARRY F. MANBECK, JR.

*Attesting Officer*     *Commissioner of Patents and Trademarks*